No. 832,158. PATENTED OCT. 2, 1906.
O. L. PLUMTREE.
WEIGHING SCALE.
APPLICATION FILED AUG. 7, 1905.
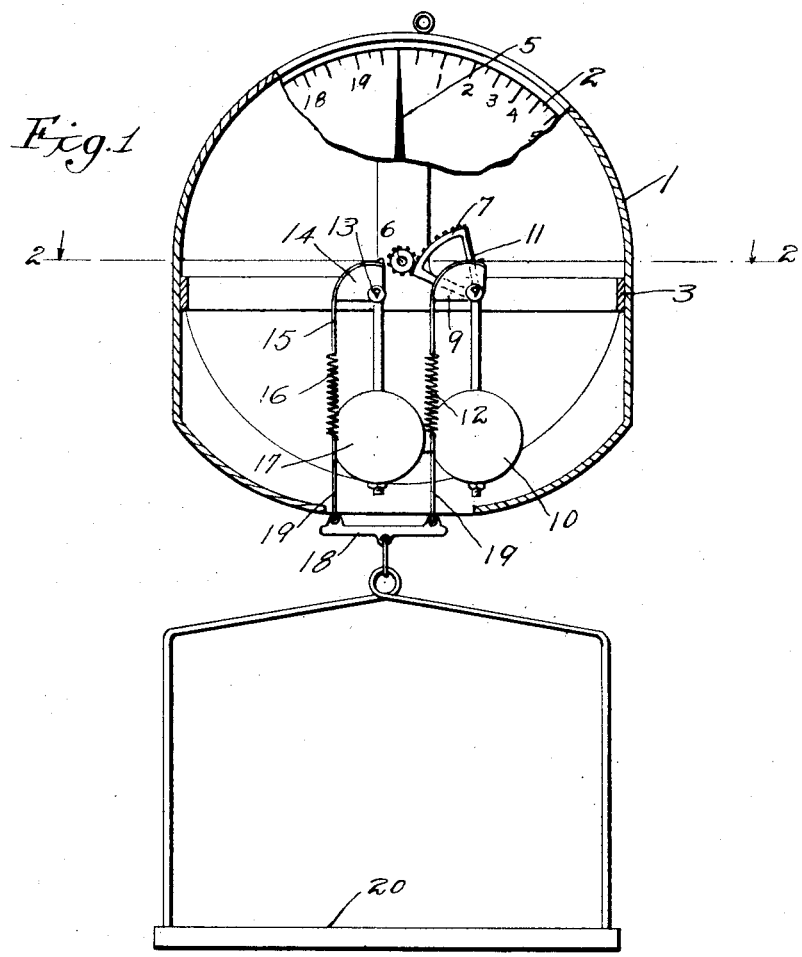
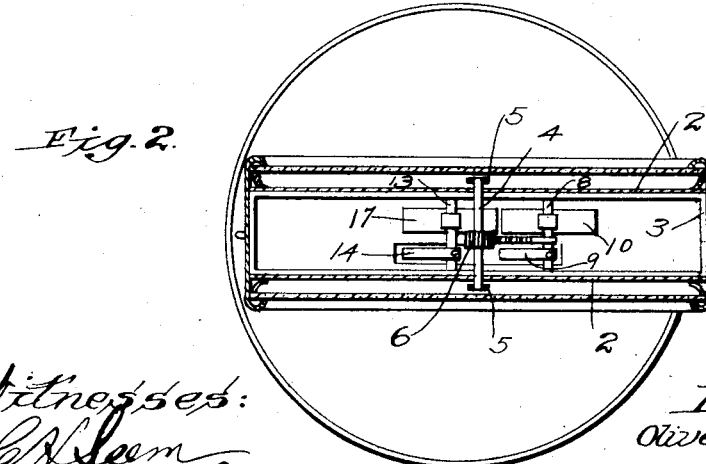
Witnesses:
Inventor
Oliver L. Plumtree

UNITED STATES PATENT OFFICE.

OLIVER L. PLUMTREE, OF CHICAGO, ILLINOIS, ASSIGNOR TO JOSEPH E. COCHRAN, OF CHICAGO, ILLINOIS.

WEIGHING-SCALE.

No. 832,158.　　　　Specification of Letters Patent.　　　　Patented Oct. 2, 1906.

Application filed August 7, 1905. Serial No. 273,001.

*To all whom it may concern:*

Be it known that I, OLIVER L. PLUMTREE, a citizen of the United States, residing at Chicago, in the county of Cook and State of Illinois, have invented new and useful Improvements in Weighing-Scales, of which the following is a specification.

This invention relates more particularly to the swinging or hanging type of weighing-scales; and it has for its primary object to provide an improved and efficient form of scale of this type, in which provision will be made for avoiding the shock or jar to the recording or registering mechanism resulting from the sudden application of a weight to the scale pan or platform.

With these ends in view the invention consists in certain features of novelty in the construction, combination, and arrangement of parts by which said objects and certain other objects hereinafter appearing are accomplished, all as fully described with reference to the accompanying drawings, and more particularly pointed out in the claims.

In the said drawings, Figure 1 is a face view of my improved scale with a portion of the dial broken away, and Fig. 2 is a plan view thereof with the casing in section.

1 is a casing, on the face of which may be supported a dial 2 of the usual or any suitable form and within which casing is arranged a frame 3 or other suitable means for supporting the internal mechanism. In this frame is journaled an arbor or spindle 4, which is shown as carrying two pointers or indexes 5, both sides of the casing in this exemplification of the invention being provided with one of the dials 2, so that the scale may be read from both sides, and on this arbor 4 is secured a pinion 6, with which meshes a toothed segment 7, secured to a rock-shaft 8. Also secured to the shaft 8 is an involute cam 9, as well as a pendulum-weight 10, and attached to the upper corner or end of the cam 9 is one end of a strap or flexible connection 11, whose lower end is secured to a spring or elastic connection 12. Mounted parallel with the shaft 8 is a second rock-shaft 13, and on this is secured an involute cam 14, which is the same in size and relative arrangement as the cam 9 and to the upper end of which is attached the upper end of a strap or flexible connection 15, whose lower end is connected to a spring or elastic connection 16, the springs 12 16 being of substantially the same resisting power. The shaft 13 is also provided with a pendulum-weight 17, rigidly secured thereto and being approximately of the same size and weight as the weight 10. To the lower end of the spring 12 is attached a cross-bar 18 by means of suitable connections 19, and from the cross-bar 18 is suspended the scale-pan 20.

By the means described it will be understood that as the pan 20 is depressed the involute cams 9 14 and their respective shafts 8 13 will be rotated and the weights 10 17 thereby lifted a degree proportionate to the load imposed upon the pan 20, and the weight of such load will be at the same time indicated by the pointers or indexes 5 through the rotation of the pinion 6. The cams 9 14 have involute peripheries, so that as the weights 10 17 move from their position of equilibrium to the point where their respective arms possess the greatest leverage upon the shafts 8 13 the leverage of the cams will decrease in direct ratio, thus providing for the use of a dial in which the graduations thereof are equal distances apart. It will also be seen that when a weight is suddenly imposed upon the pan 20 the initial shock or strain will be absorbed by the springs or cushions 12 16 before it can overcome the inertia of the weights 10 17, and as a consequence severe strain upon the pinion and segment 7 will be prevented. These springs, however, cannot by any amount of variation in tension affect the accuracy of the scale, as would be the case with the ordinary spring-balance, because the weighing operation is performed solely through the aid of the weights 10 17, whose effect upon the arbor of the index remains constant.

Having thus described my invention, what I claim as new therein, and desire to secure by Letters Patent, is—

1. In a weighing-scale, the combination of an index, a pinion for rotating the same, two rocker-shafts, two involute cams, a segment-rack secured to one of said cams and engaging said pinion for rotating the same, two weights attached to said cams respectively and acting thereon to return the cams to predetermined positions, flexible connections attached at one end to said cams respectively, and a scale pan or platform yieldingly supported by said flexible connections.

2. In a weighing-scale, the combination of an index, a pinion for revolving the same, two involute cams, a segment secured to one of said cams and engaging said pinion, two weights suspended from said cams respectively and acting to return the cams to predetermined positions, flexible connections secured to said cams and bearing upon the peripheries thereof respectively, a scale platform or pan, and an elastic connection between said platform and said flexible connections.

In witness whereof I have hereunto set my hand, this 5th day of August, 1905, in the presence of the subscribing witnesses.

OLIVER L. PLUMTREE.

Witnesses:
  E. C. SEMPLE,
  FRANCIS A. HOPKINS.